Aug. 31, 1965  F. B. MILLER  3,203,363
BULKHEAD GUIDE BRACKET
Filed March 22, 1962  2 Sheets-Sheet 1
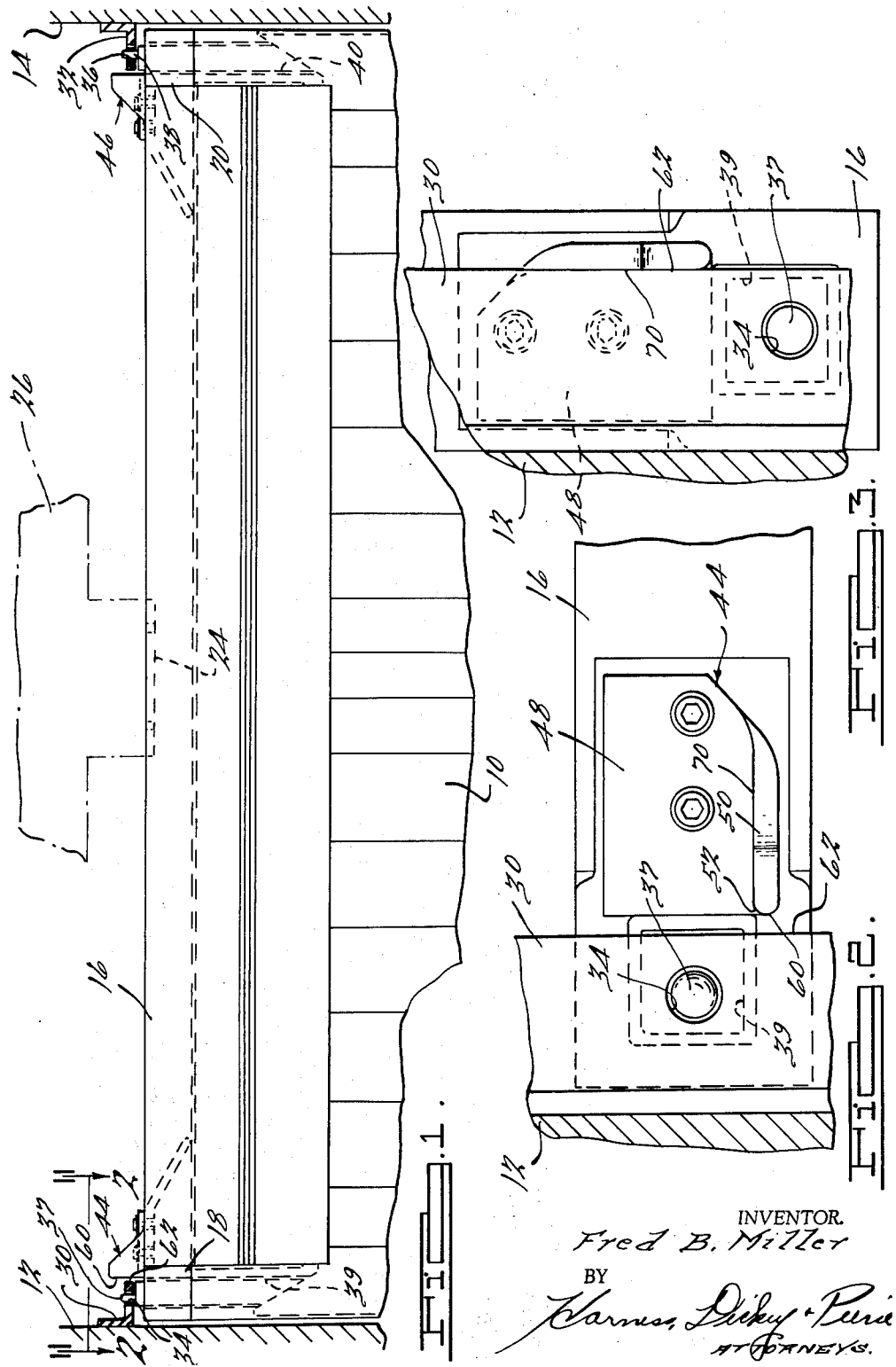
INVENTOR.
Fred B. Miller
BY
Harness, Dickey & Pierce
ATTORNEYS.

Aug. 31, 1965    F. B. MILLER    3,203,363
BULKHEAD GUIDE BRACKET
Filed March 22, 1962    2 Sheets-Sheet 2

INVENTOR.
Fred B. Miller
BY
Barnes, Dickey & Pierce
ATTORNEYS.

United States Patent Office 3,203,363
Patented Aug. 31, 1965

3,203,363
BULKHEAD GUIDE BRACKET
Fred B. Miller, Livonia, Mich., assignor to Evans Products Company, Plymouth, Mich., a corporation of Delaware
Filed Mar. 22, 1962, Ser. No. 181,586
3 Claims. (Cl. 105—376)

This invention relates to cargo handling systems and more particularly to a bulkhead device therefor.

In cargo handling systems for use in railway vehicles such as boxcars, movable bulkheads are commonly provided to obtain variable spacing within the cargo containers. The bulkheads are conventionally provided with trolley assemblies to movably support the bulkheads for movement along the length of the boxcar. The trolley assemblies are mounted on longitudinally extending track means fixed to the side walls of the boxcars. Locking means are conventionally provided to secure the bulkhead in varying positions along the track means. The locking means commonly comprise longitudinally extending rails, which are fixedly secured to the side walls of the boxcar, and lock pins carried by the bulkhead for association with pin holes provided in the rails. In addition to being movable longitudinally of the boxcar on the track means, some types of bulkheads are also pivotally movable about a central pivotal connection to a position lying substantially flat against the side walls of the boxcar rather than extending transversely therebetween. In the use of bulkheads which are movable along the side walls and which are also pivotally movable to a position parallel to the side walls, it is desirable to maintain the bulkhead locking pins in proper spaced relationship relative to the pin holes in the rails in all positions.

Accordingly, an object of this invention is to provide guide means to facilitate alignment and positioning of a movable bulkhead relative to locking means associated therewith.

Another object of the present invention is to provide guide and locating means limiting displacement of a bulkhead away from locking means on the side walls of a container with which it is associated.

Still another object of the present invention is to provide an improved bulkhead construction wherein the bulkhead will be positively prevented from bumping and scraping the side walls of the cargo container with which it is associated by guide and locating means.

Other objects and advantages of the present invention will be apparent or become apparent by reference to the following detailed description and the accompanying drawing wherein:

FIGURE 1 is a partial end elevational view of apparatus embodying the principles of the present invention;

FIGURE 2 is a partial enlarged sectional view taken along the line 2—2 in FIGURE 1;

FIGURE 3 is an enlarged partial sectional view taken along the line 2—2 in FIGURE 1; but showing the bulkhead rotated 90° and positioned along a side wall of the cargo container;

Figure 4:
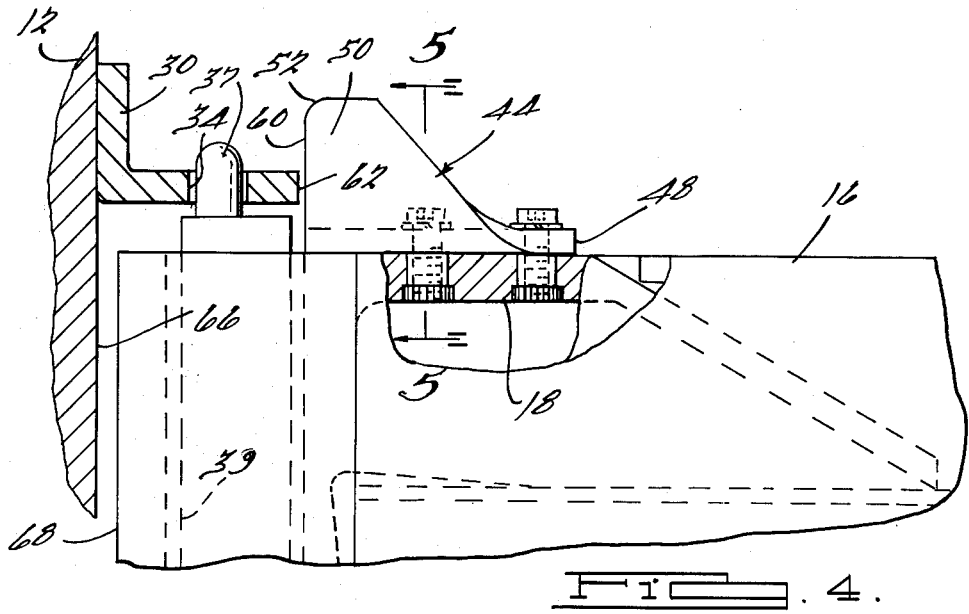
FIGURE 4 is an enlarged partial side elevational view, partly in section, of a portion of the apparatus shown in FIGURE 1.
Figure 5:
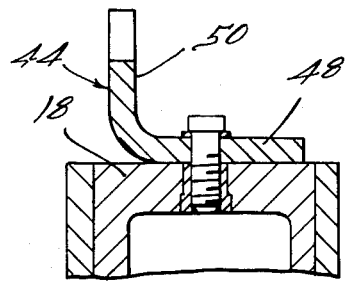
FIGURE 5 is a sectional view taken along the line 5—5 in FIGURE 4.

Referring now to FIGURE 1, a bulkhead 10 is shown in partitioning position between a pair of parallel side walls 12, 14. The bulkhead comprises an upper support frame portion 16 and corner castings 18, 20 to which the central portion of the bulkhead is secured. The upper frame portion 16 is provided with a centrally located connecting plate 24 which conventionally pivotally secures the bulkhead to a trolley assembly 26 having spaced support wheels (not shown) which are rotatably supported on a trackway fixed to a portion of a cargo container such as the side walls 12 and 14. Since the trolley assembly and the associated track assembly on the side walls of the cargo container are conventional none of the details thereof are deemed to be necessary to an understanding of the present invention. Such an arrangement is now known in the art and is shown in the copending application of Paul N. Erickson et al., Serial No. 69,351, for Freight Bracing Apparatus, filed November 15, 1960. A similar arrangement of an overhead track with a locking rail spaced therebelow is shown in U.S. Patent 3,017,843. Suffice it to say that the track assembly includes a plurality of longitudinally extending rails which in the illustrative embodiment are securely fastened to the side walls of the cargo container in a manner similar to locking rail means 30, 32 which are shown in FIG. 1. It should be understood that although the locking rails 30 and 32 are utilized for a particular purpose and to obtain a particular result in the illustrative embodiment, that other portions of the track assembly may be utilized in a similar manner. While the bulkhead means in the aforementioned U.S. Patent 3,017,843 comprises a double door arrangement with the track means and locking rail means fixedly mounted on the roof of the cargo container, it will be apparent that the inventive principles herein disclosed are equally well applicable thereto.

The locking rails 30, 32 extend longitudinally of the cargo container and are provided with a series of pin receiving means in the form of spaced apertures 34, 36 which are adapted to receive locking pin means 37, 38 slidably supported in cavities 39, 40 in the corner castings 18, 20. The pin means are vertically actuable by conventional linkage (not shown) between latched and unlatched positions relative to the pin holes 34, 36. The bulkhead 10 is movable from the position shown in FIG. 1 whereat it extends transversely between the side walls 12 and 14 to a position substantially parallel to the side walls and spaced closely adjacent thereto as shown in FIG. 3.

This invention is particularly directed to guide and locating means for positively locating the bulkhead and locking pins associated therewith relative to the apertures 34, 36 in the locking rails 30, 32 and for guiding the bulkhead during movement between various positions. To this end, guide and locating bracket means 44, 46 are fastened on the top of the upper corner castings 18 and 20 by suitable fastening means. The castings comprise a flat bottom plate portion 48 which is adapted to lie flush on the top of the corner casting 18 and an upwardly extending flange portion 50 which terminates in a rounded end portion 52.

In the partitioning position of the bulkhead 10 wherein it extends transversely to the side walls 12, 14, an abutment surface in the form of the end surface 60 of the vertically extending flange 50 is spaced closely adjacent and is adapted to engage the edge 62 of the locking plate 30, which provides a continuous guide and locating abutment, to align the pin means with the pin holes and facilitate movement of the bulkhead between the various positions. The space between the surface 60 of the guide bracket and the surface 62 of the locking plate 30 (somewhat exaggerated in FIGURE 2) is smaller than the spacing between the side surface 66 of the wall 12 and the side surface 68 of the bulkhead. Consequently, the bulkhead is provided with guide means during movement between partition positions since any movement of the bulkhead transversely to the side walls will be interrupted by engagement of the surface 60 with the surface 62. The relative spacing of the parts is such that engagement of surfaces 60 and 62 positively locates the apertures 34, 36 relative to the pins carried in the cavities 39, 40.

When the bulkhead is pivoted to a stowed position extending parallel to the side walls and moved into a position closely adjacent one of the side walls, the guide bracket serves the identical function of aligning the pins relative to the pin holes. In the alternative stowed position, a second abutment surface formed by the side surface 70 of the guide brackets is engaged with abutment surface 62 of the locking plate 30 as shown in FIGURE 3. The rounded end portion 52 of the flange 50 forms a continuous abutment surface with the abutment surface 70 and facilitates movement of the bulkhead between the partitioning position and the alternative position. In effect, the abutment surfaces 60, 70 lie in transverse intersecting planes which are offset from the central axis of the pin means 37 approximately equal distances such that engagement of either of the abutment surfaces 60, 70 with the abutment 62 will align the pin means 37 with the pin receiving means 34 and permit extension and retraction of the pin means relative to the pin receiving means.

Accordingly, it may be seen that the guide brackets provided on each end of the bulkhead in accordance with the principles of the present invention, provide positive stop means to locate the bulkhead in a particular spaced relationship relative to the locking rails and side walls of the cargo container in all positions of the bulkhead. Since the guide brackets may have alternative forms and may be mounted for association with other rail portions of the bulkhead apparatus, it is intended that the scope of this invention, as defined by the appended claims, include alternative forms which utilize the inventive principles herein disclosed.

The invention claimed is:

1. In a bulkhead means for use in a cargo container of the type having spaced parallelly extending side walls, fixed bulkhead support means fixedly mounted in said cargo container, longitudinally movable bulkhead support means movably supporting said bulkhead means on said fixed bulkhead support means and being movable longitudinally within said cargo container, said bulkhead means adapted to be mounted in said cargo container in various partitioning positions extending transversely between the side walls of said cargo container and having cargo engaging side surfaces extending transversely between the side walls of the cargo container and end walls extending parallelly to the side walls in the partitioning positions, said bulkhead means being movable between the various partitioning positions longitudinally of said container with the end walls parallel and the cargo engaging side surfaces transverse to said side walls of said cargo container, transversely movable bulkhead support means movably supporting said bulkhead means on said fixed bulkhead support means and being movable transversely within said cargo container, pivotal connecting means between said bulkhead means and said transversely movable bulkhead support means, said bulkhead means also being adapted to be mounted in said cargo container in various stowed positions extending parallelly between the side walls of said cargo container and having the cargo engaging side surfaces extending parallelly with the side walls, said bulkhead means being movable between the various stowed positions longitudinally of said container with the end walls transverse and the cargo engaging side surfaces parallel to said side walls of said cargo container, said bulkhead means being movable between a stowed position and a partitioning position by pivotal movement about said pivotal connecting means and by transverse movement with said transversely movable bulkhead support means, extendable and retractable locking means mounted on said bulkhead means and being operable between extended and retracted positions to hold said bulkhead means in the partitioning positions and in the stowed positions, locking means fixedly mounted in the cargo container above said bulkhead means and said extendable and retractable locking means, a plurality of openings provided by said locking means to receive said extendable and retractable locking means and lock said bulkhead means in the partitioning positions and in the stowed positions: the invention comprising guide and locating abutment means provided adjacent said locking means, guide and locating bracket means mounted on said bulkhead means, each guide and locating bracket means having a first abutment surface extending parallel to said abutment means adjacent said locking rail means in the partitioning positions of said bulkhead means and being spaced from said abutment means a distance less than the spacing of said end walls of said bulkhead means from said side walls of said container, said first abutment surface being spaced from said extendable and retractable locking means a distance approximately equal to the spacing of said abutment means from said openings to provide alignment between said extendable and retractable locking means and said openings when said first abutment surface engages said abutment means, and a second abutment surface extending parallel to said abutment means in the stowed positions of said bulkhead means and being spaced from said extendable and retractable locking means a distance approximately equal to the spacing of said abutment means from said openings when said second abutment surface engages said abutment means.

2. In a bulkhead means for use in a cargo container of the type having spaced parallelly extending side walls, fixed bulkhead support means fixedly mounted in said cargo container longitudinally movable bulkhead support means movably supporting said bulkhead means on said fixed bulkhead support means and being movable longitudinally within said cargo container, said bulkhead means adapted to be mounted in said cargo container in various partitioning positions extending transversely between the side walls of said cargo container and having cargo engaging side surfaces extending transversely between the side walls of the cargo container and end walls extending parallelly to the side walls in the partitioning positions, said bulkhead means being movably between the various partitioning positions longitudinally of said container with the end walls parallel and the cargo engaging side surfaces transverse to said side walls of said cargo container, transversely movable bulkhead support means movably supporting said bulkhead means on said fixed bulkhead support means and being movable transversely within said cargo container, pivotal connecting means between said bulkhead means and said transversely movable bulkhead support means, said bulkhead means also being adapted to be mounted in said cargo container in various stowed positions extending parallelly between the side walls of said cargo container and having the cargo engaging side surfaces extending parallelly with the side walls of the cargo container and the end walls extending transversely to the side walls, said bulkhead means being movable between the various stowed positions longitudinally of said container with the end walls transverse and the cargo engaging side surfaces parallel to said walls of said cargo container, said bulkhead means being movable between a stowed position and a partitioning position by pivotal movement about said pivotal connecting means and by transverse movement with said transversely movable bulkhead support means, extendable and retractable locking means mounted on said bulkhead means and being operable between extended and retracted positions to hold said bulkhead means in the partitioning positions and in the stowed positions, locking means fixedly mounted in the cargo container above said bulkhead means and said extendable and retractable locking means, a plurality of openings provided by said locking means to receive said extendable and retractable locking means and lock said bulkhead means in the partitioning positions and in the stowed positions: the invention comprising guide and locating abutment means provided adjacent said locking means, guide and locating bracket means mounted on said bulkhead means, each guide and locating bracket means having a first abutment surface extending parallel to said abutment means adjacent said locking rail means in the partitioning positions of said bulkhead means and being spaced from said abutment means a distance less than the spacing of said end walls of said bulkhead means from said side walls of said container, said first abutment surface being spaced from said extendable and retractable means a distance approximately equal to the spacing of said abutment means from said openings to provide alignment between said extendable and retractable locking means and said openings when said first abutment surface engages said abutment means, a second abutment surface extending parallel to said abutment means in the stowed positions of said bulkhead means and being spaced from said extendable and retractable locking means a distance approximately equal to the spacing of said abutment means from said openings when said second abutment surface engages said abutment means, and an integral connecting guide surface between said first abutment surface and said second abutment surface engageable with said abutment means during pivotal movement of said bulkhead between the partitioning positions and the stowed positions.

3. In a bulkhead arrangement for use in a cargo container or the like having spaced side walls, fixedly mounted bulkhead support means mounted in said cargo container, bulkhead means movably supported by said bulkhead support means for movement between a plurality of partitioning positions extending transversely to said side walls, said bulkhead means being additionally movable to any of a plurality of stowed positions extending parallel to said side walls in closely spaced relationship therewith, locking rail means fixedly mounted in said cargo container above the upper corners of said bulkhead means and having a plurality of lock receiving means spaced therealong, lock means mounted in each upper corner of said bulkhead means and being operable between extended and retracted positions relative to said lock receiving means and being operable in the extended position to lock said bulkhead means in any of the partitioning or stowed positions, the invention comprising: guide and locating abutment means fixedly mounted in said cargo container adjacent the upper corners of said bulkhead means and extending parallelly to said side walls, guide and locating means provided on each upper corner of said bulkhead means, each guide and locating means comprising a first abutment surface extending parallel to said abutment means in the partitioning position of said bulkhead means, a second abutment surface extending transversely to said first abutment surface and extending parallel to said abutment means in the stowed position of said bulkhead means, each of said abutment surfaces when parallel to said abutment means being spaced from said lock means a distance approximately equal to the spacing of said abutment means from said lock receiving means to provide alignment between said lock means and said lock receiving means facilitating extension of said lock means into locking engagement with said lock receiving means, and said first abutment surface serving as a guide for said bulkhead during movement between partitioning positions and always being spaced from said abutment means in the partitioning position a distance less than the spacing of the side surfaces of said bulkhead from the side walls of said container.

References Cited by the Examiner

UNITED STATES PATENTS

| | | | |
|---|---|---|---|
| 2,543,143 | 2/51 | Wells et al. | 105—376 |
| 2,674,207 | 4/54 | Kerbaugh et al. | 105—376 |
| 3,017,843 | 1/62 | Loomis et al. | 105—376 |
| 3,018,741 | 1/62 | Loomis et al. | 105—376 |

MILTON BUCHLER, *Primary Examiner.*

JAMES S. SHANK, LEO QUACKENBUSH, *Examiners.*

UNITED STATES PATENT OFFICE
CERTIFICATE OF CORRECTION

Patent No. 3,203,363 August 31, 1965

Fred B. Miller

It is hereby certified that error appears in the above numbered patent requiring correction and that the said Letters Patent should read as corrected below.

Column 3, line 60, after "side walls" insert -- of the cargo container and the end walls extending transversely to the side walls --.

Signed and sealed this 5th day of April 1966.

(SEAL)
Attest:

ERNEST W. SWIDER
Attesting Officer

EDWARD J. BRENNER
Commissioner of Patents